United States Patent [19]

Lew

[11] Patent Number: 4,754,649
[45] Date of Patent: Jul. 5, 1988

[54] TANDEM WING UNIVERSAL VORTEX SHEDDING FLOW METER

[76] Inventor: Hyok S. Lew, 7890 Oak St., Arvada, Colo. 80005

[21] Appl. No.: 920,977

[22] Filed: Oct. 20, 1986

Related U.S. Application Data

[63] Continuation-in-part of Ser. No. 764,890, Aug. 12, 1985, Pat. No. 4,627,294.

[51] Int. Cl.$^4$ ................................................ G01F 1/32
[52] U.S. Cl. .............................. 73/861.05; 73/861.24
[58] Field of Search ............ 73/861.22, 861.24, 861.05

[56] References Cited

U.S. PATENT DOCUMENTS 4,329,880  5/1982  Herzl ................................ 73/861.24

FOREIGN PATENT DOCUMENTS

823684  11/1959  United Kingdom .

Primary Examiner—Herbert Goldstein

[57] ABSTRACT

A flowmeter comprising a vortex generator generating and shedding vortices intermittently wherein the vortices are generated naturally by the fluid flowing around the vertex generator or generated artificially by the change of flow pattern resulting from the artificial manipulation of the vortex generator, and a pair of vortex sensing wings arranged in tandem, wherein the flow velocity is determined by measuring the frequency of the vortices naturally generated and shed by the vortex generator or by measuring the time of travel of the artificial vortices required to move from the vortex generator or the first wing to the second wing of the two tandem wings.

20 Claims, 2 Drawing Sheets

TANDEM WING UNIVERSAL VORTEX SHEDDING FLOW METER

This patent application is a continuation-in-part application to patent application Ser. No. 764,890 entitled "Pulsed Eddy Flowmeter" which was filed on Aug. 12, 1985 now U.S. Pat. No. 4,627,294.

BACKGROUND OF THE INVENTION

A blunt object commonly known as a bluff body immersed in a stream of flowing fluid generates and sheds natural vortices from two sides of the bluff body in an alternating pattern wherein these vortices move downstream in two rows. The frequency at which these natural vortices are shed from the bluff body is directly proportional to the fluid velocity in the range of the Reynolds number greater than 1,000 and less than 400,000 and is a nonlinear function of the fluid velocity outside the aforementioned range of the Reynolds number, wherein the Reynolds number is a dimensionless number equal to Ub/V where U is the fluid velocity, b is the width of the bluff body and V is the kinematic viscosity of the fluid. In reality, the bluff body generates and sheds natural vortices in the range of Reynolds number greater than 50 and less than about 10,000,000. Since the vortex shedding frequency is directly proportional to the flow velocity in the range of Reynolds number greater than 1,000 and less than 400,000, the fluid velocity can be determined by measuring the vortex shedding frequency. A flowmeter that measures the fluid velocity by detecting a vortex shedding frequency is called the vortex shedding flowmeter. Vortex shedding flowmeters are widely accepted by today's industry as evidenced by the annual sale of 60 million dollars in 1985. A typical vortex shedding flowmeter of the present day technology includes a bluff body, which is a bar with a blunt cross section disposed perpendicular to the direction of the fluid stream, and means for sensing the vortices shed from the bluff body, which may be a transducer sensing the light force on the bluff body or wing disposed downstream of the bluff body, or transducer sensing the pressure fluctuations caused by the vortices shed from the bluff body. In general, the vortex shedding flowmeters available today measure the fluid flow in the range of Reynolds number greater than 10,000 and less than 200,000, while the operating limit of the vortex shedding flowmeter dictated by the nature is in the range of the Reynolds number greater than 1,000 and less than 400,000. In other words, the present day vortex shedding flowmeters have only 20 to 1 turn down ratio, while the turn down ratio of a perfect vortex shedding flowmeter should have 400 to 1. For the Reynolds number less than 10,000, the fluctuations in the fluid pressure or in the streamlines created by the vortices naturally shed from the bluff body is too weak to be distinguished from the noises transmitted through the pipe wall or through the fluid medium and, consequently, they are too weak to be detected by the present day sensor technology employed in the construction of the existing vortex shedding flowmeters. Typically, the minimum velocity measurable by the existing vortex shedding flowmeter is about 20 to 25 feet per second for air flow under the standard condition and 1 to 2 feet per second for water flow. There are many demands in the industries requiring measurement of gas flows lower than 20 feet per second velocity and liquid flows lower than 1 feet per second velocity. A perfect vortex shedding flowmeter utilizing the full range of feasibility offered by nature should measure gas flows of velocity as low as 2 feet per second and liquid flow of velocity as low as 0.2 feet per second, which velocities are approximately corresponding to the Reynolds number of 1,000. The aforementioned fact indicates that the present state of the art in the vortex shedding flowmeter technology is at an infantile stage and that we have seen only the tip of the iceberg in the versatility and potential application of the vortex shedding flowmeters.

SUMMARY OF THE INVENTION

The primary object of the present invention is to provide a vortex shedding flowmeter capable of measuring fluid velocity in the range of Reynolds number greater than 2,000, while the existing vortex shedding flowmeters manage to operates in the range of Reynolds number greater than 10,000.

Another object is to provide a vortex shedding flowmeter operating in the range of 100 to 1 turn down ratio, while the existing vortex shedding flowmeters operate in the range of 20 to 1 turn down ratio.

A further object of the present invention is to provide a vortex shedding flowmeter including a pair of wings arranged in tandem wherein the vortices shed from the bluff body produces pivoting movements on the tandem wing about an axis substantially parallel to and intermediate the pair of wings.

Yet another object is to provide a vortex shedding flowmeter comprising tandem wings wherein the two wings are balanced in mass about the pivoting axis parallel to and intermediate the two wings.

Yet a further object is to provide a vortex shedding flowmeter comprising tandem wings wherein the vortex shedding frequencies are detected by a pair of piezoelectric elements disposed about the plane including the chord lines of the tandem wings in a mirror image to one another, which piezoelements detect the pivoting movements of the tandem wings about the pivoting axis parallel to and intermediate the two wings produced by the lift forces respectively imposed on the two wings in two opposite directions, which lift forces are generated by the vortices shed from the bluff body, while the two balanced wings prevent any pivoting movement of the tandem wings resulting from the vibration associated with noises.

Still another object is to provide a vortex shedding flowmeter with tandem wings including means for artificially generating vortices and means for detecting the time of travel of the artificially generates vortices from the first wing to the secondwing of the tandem wings.

Still a further object is to provide a vortex shedding flowmeter with tandem wings that detect the natural vortex shedding frequencies when the strength of the natural vortices are sufficient for detection, and generates artificial vortices and measures the time of the artificial vortices when the strength of the natural vortices are insufficient for detection.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
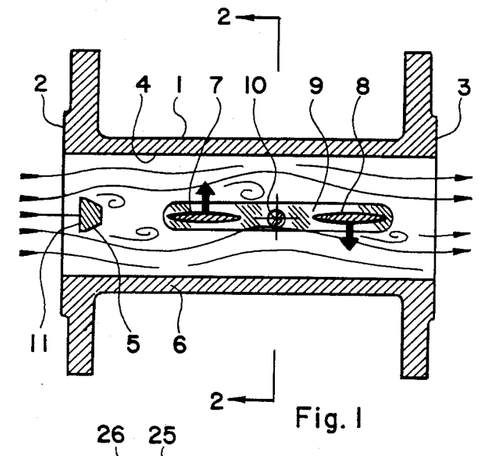
FIG. 1 illustrates a cross section of an embodiment of the tandem wing vortex shedding flowmeter constructed in accordance with the principles of the present invention.

In FIG. 1 there is illustrated a cross section of an embodiment of the tandem wing vortex shedding flowmeter constructed in accordance with the principles of the present invention, which cross section is taken along a plane including the central axis of the flow passage. The flowmeter body 1 comprising coupling means 2 and 3 respectively disposed at the two extremities thereof, which are for connecting the flowmeter body to the pipe line, includes a flow passage 4 extending from one extremity to the other extremity of the flowmeter body. The vortex generator comprises a bluff body 5 of an elongated cylindrical shape having a cross section of a blunt geometry that is disposed across a first cross section of the flow passage 4, wherein the two extremities of the bluff body 5 is affixed to the wall 6 of the flow passage 4. The tandem wing vortex sensor comprises a first wing 7 and a second wing 8 respectively disposed across a second and third cross section of the flow passage 4 in a substantially parallel relationship with respect to the bluff body 5. The two wings 7 and 8 are connected to one another by at least one thin elongated connecting member 9 disposed substantially parallel to the central axis of the flow passage and adjacent to the wall of the flow passage. The tandem wing vortex sensor assembly comprising the two wings 7 and 8 connected to one another by the connecting member 9 is pivotably secured to the wall of the flow passage, wherein the tandem wing vortex sensor is pivotable about a pivoting axis 10 located half way between the two wings in a parallel relationship with respect to the two wings. The two wings 7 and 8 are balanced in mass about the pivoting axis 10 whereby the inertia forces created by the vibration of the flowmeter body does not produce any pivoting movements of the tandem wing vortex sensor about the pivoting axis 10.

The bluff body 5 has a blunt cylindrical face 11 blocking the stream of the moving fluid. The fluid medium flowing around the bluff body 5 produces a series of vortices trailing the bluff body 5 in two rows in a skewed pattern as shown in FIG. 1. These vortices periodically shed from the bluff body distort the streamlines downstream of the bluff body into wavy or sinuous patterns. In the range of Reynolds number greater than 1,000 and less than 400,000, the frequency f of the vortex shedding is proportional to the fluid velocity, i.e., $$f = S_t (U/b),$$

where $S_t$ is a dimensionless coefficient of proportionality known as Strouhal number which is a constant in the aforementioned range of Reynolds number, U is the fluid velocity and b is the width of the bluff body. It is not difficult to realize that the wave length l of the sinuating streamlines is given by the equation $$l = (2U/f)$$

or $$l = (2b/S_t).$$

When the distance d between the center-lines of the two wings 7 and 8 is set equal to one half plus integer times the wave length of the sinuous streamlines, i.e., $$d = (N + \tfrac{1}{2})l$$

or $$d = (2N+1)(b/S_t),$$

where N is an integer number, the direction of the lift forces on the two wings are always opposite to one another and, consequently, the lift forces on the two wings comprise alternating couple resulting in alternating torque about the pivoting axis 10, which oscillates at the same frequency as that of the vortex shedding. Therefore, the fluid velocity can be determined by detecting the frequency of the torsional oscillation of the tandem wing vortex sensor. The Strouhal number $S_t$ has a numerical value approximately equal to 0.25. In actual construction, the distance between the two wings in the tandem wing vortex sensor may be determined from the aforementioned equation by substituting N=1 for flowmeters with bore diameter equal to or less than 1½ inch and N=0 for flowmeters with bore diameter greater than 2 inchs. In other words, the distance between the two wings in the tandem wing vortex sensor should be 12 times the bluff body width for flowmeters equal to or smaller than 1½ inch in size, while it should be equal to 4 times the bluff body width for flowmeters larger than 2 inch in size. It is generally recommended to employ a bluff body width b approximately equal to one quarter of the diameter of the flow passage. In order to generate maximum torque on the tandem wing vortex sensor, one may employ the wing chord length slightly less than $b/S_t$, i.e., the wing chord length should be about 2 to 3 times the bluff body width b.

Figure 2:
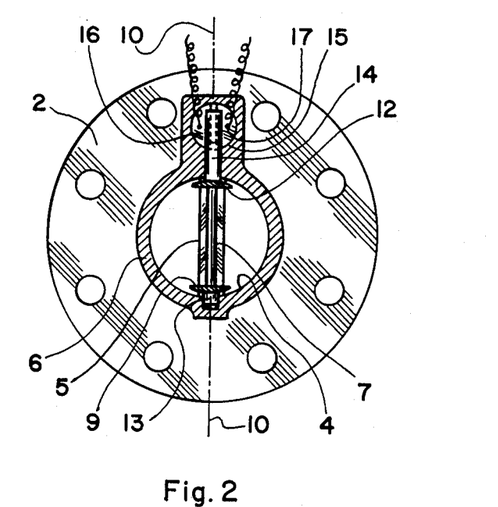
FIG. 2 illustrates another cross section of the embodiment shown in FIG. 1.

In FIG. 2, there is illustrated another cross section of the tandem wing vortex shedding flowmeter shown in FIG. 1, which cross section is taken along plane 2—2 as shown in FIG. 1. In this particular embodiment, the two wings 7 and 8 are connected to one another by a pair of connecting members 9 and 12 respectively disposed adjacent to two diametrically opposite portions of the flow passage wall. The tandem wing assembly is pivotably secured to the wall 6 of the flow passage 4 by a pair of journals 13 and 14 respectively extending f from the two connecting members 9 and 12 in two diametrically opposite radial directions and rotatably engaging two journal bearings included in the wall of the flow passage, whereby the tandem wing assembly is pivotable about the pivoting axis 10. The pivoting movement or torque exerted on the tandem wing assembly by the vortices shed from the bluff body 5 is detected by a torsion detector 16 comprising a pair of piezoelectric elements 16 and 17 disposed on a plane parallel to the pivoting axis 10 in a mirror image to one another about a plane including the pivoting axis 10.

Figure 3:
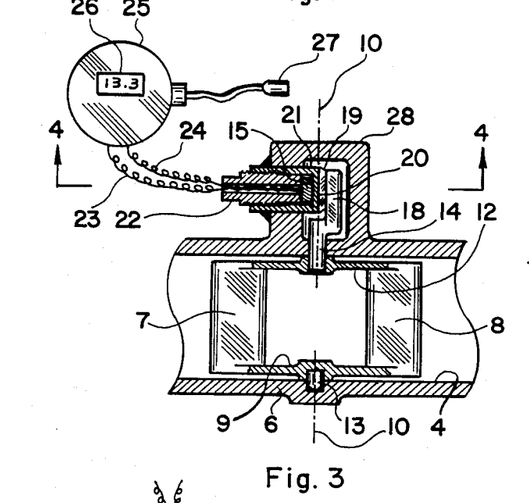
FIG. 3 illustrates a cross section of an embodiment of the transducer installed in conjunction with the tandem wings such as that included in the vortex shedding flowmeter shown in FIGS. 1 and 2.

In FIG. 3 there is illustrated a cross section of the embodiment of the transducer included in the tandem wing vortex shedding flowmeter shown in FIGS. 1 and 2, which cross section is taken along a plane simultaneously including the central axis of the flow passage 4 and the pivoting axis 10 of the tandem wing vortex sensor. The tandem wing vortex sensor including the two wings 7 and 8 connected to one another by the pair of connecting members 9 and 12 are pivotably secured to the wall 6 of the flow passage 4 by means of a pair of journals 13 and 14 rotatably engaging two journal bearings included in the wall 6 of the flow passage 4, whereby the tandem wing vortex sensor is pivotable about the pivoting axis 10 coinciding with the central axis of the journals 13 and 14. A torque transmitting member 18 rigidly affixed to one of the journal 14 and extending therefrom in an eccentric and parallel relationship thereto is connected to a web 19. The web 19 extends from a thin diaphragmatic flange 20 constituting the closed end of the vessel 21 housing the piezoelectric transducer 15, wherein the piezoelectric transducer 15 is under a pressurized contact with the diaphragmatic flange 20 as it is pressed against the diaphragmatic flange 20 by the threaded plug 22 threadedly plugging the open end of the vessel 21. As illustrated in FIG. 2, the piezoelectric transducer 15 comprises two piezoelectric elements 16 and 17 disposed on a plane parallel to the pivoting axis 10 in a mirror image to one another about a plane including the pivoting axis 10 and the central axis of the vessel 20 housing the piezoelectric element. A pair of wires 23 and 24 respectively connected to the two piezoelectric elements 16 and 17 transmits electric signals generated by the piezoelectric elements 16 and 17 to an electric data processor 25 which converts the electric signals from the piezoelectric transducer 15 to information directly related to the fluid flow through the flow passage 4 wherein the information is displayed by a display unit 26 or transmitted to other flow controlling or processing devices by means of outlet terminal 27. It should be understood that the pivoting axis 10 substantially coincides with the line of intersection between the diaphragmatic flange 20 and the web 19, which arrangement minimizes the mechanical resistance hindering the transmission of torque about the pivoting axis 10 from the tandem wing vortex sensor to the piezoelectric transducer 15. The vessel 21 housing the transducer assembly extends through and welded to the wall of the housing 28 that containes the combination of the torsion transmitting element 18, web 19 and diaphragmatic flange 20 in a leak-proof confinement.

Figure 4:
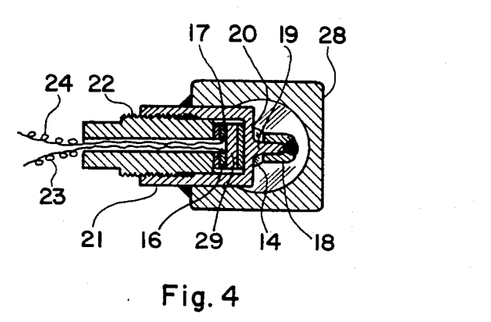
FIG. 4 illustrates another cross section of the embodiment of the transducer shown in FIG. 3.

In FIG. 4 there is illustrated another cross section of the transducer assembly shown in FIG. 3, which cross section is taken along plane 4—4 as shown in FIG. 3. The piezoelectric transducer 15 comprises a disc shaped piezoelectric crystal 29 having the two faces respectively including flat electrodes 16 and 17 disposed on a plane parallel to the pivoting axis 10 in a mirror image to one another about a plane including the pivoting axis 10 and the central axis of the vessel 21 housing the transducer assembly. The face of the piezoelectric crystal under a pressurized contact with the diaphragmatic flange 20 is grounded to the metalic vessel 21 housing the piezoelectric crystal and, consequently, to the flowmeter body. The piezoelectric electrodes 16 and 17 respectively connected to the wires 23 and 24 are insulated from the ambient conducting elements such as the vessel 21 and the plug 22. The wires 23 and 24 are routed through an axial hole disposed through the plug 22.

The tandem wing vortex shedding flowmeter of the present invention described in conjunction with FIGS. 1, 2, 3 and 4 operates on the following principles: The bluff body 5 generates a series of vortices which produces sinuous streamlines downstream of the bluff body. The two wings in the tandem wing vortex sensor are separated from one another by such a distance that the alternating lift forces on the two wings generated by the sinuous streamlines are always in two opposite directions and, consequently, the tandem wing vortex sensor experiences alternating torques or torsions about the pivoting axis disposed halfway between the two wings. The frequency of the alternating torques experienced by the tandem wing vortex sensor is the same as that of the vortex shedding. The fluid velocity that is proportional to the frequency of the vortex shedding is determined from the measured value of the frequency at which the torque experienced by the tandem wing vortex sensor oscillates. The proportional coefficient relating the vortex shedding frequency to the fluid velocity is determined by experiments known as the flowmeter calibration.

The tandem wing vortex shedding flowmeter of the present invention described the following advantage over the existing vortex shedding flowmeters: Firstly, the tandem wing vortex sensor provides high amplitude signals directly related to the vortex shedding frequency that is much greater than any vortex sensor employed in the existing vortex shedding flowmeters, becauses, firstly, the tandem wing vortex sensor of the present invention employs two wings of large surface area that pick up the maximum lift forces available; secondly, the couple comprising tow large lift forces on the two wings acting in two opposite directions is converted to a torque of high amplitude by means of the long torque arm provided by the elongated connecting members connecting the two wings; and, thirdly, the mechanical resistance hindering the transmission of the torque generated by the vortices from the tandem wing vortex sensor to the piezoelectric transducer is very small and, consequently, nearly all of the torques associated with the vortices are transmitted to the piezoelectric transducer without being canceled by the mechanical resistance of the vortex sensor assembly. Secondly, the two wings in the tandem wing vortex sensor are balanced in mass about the pivoting axis and, consequently, the inertia forces on the two wings generated by the vibration of the pipe line cancel one another and produces no torque that is transmitted to the piezoelectric transducer. Thirdly, the piezoelectric transducer including two piezoelectric elements disposed on a plane parallel to the pivoting axis of the tandem wing vortex sensor in a mirror image to one another about a plane including the pivoting axis is totally insensitive to all noises transmitted to the piezoelectric transducer. The signal from the piezoelectric elements used to detect the vortex shedding frequency is the electromotive force across the two piezoelectric elements included in the transducer, which electromotive is created when one piezoelectric element is under compression and the other piezoelectric element is under tension as in the case of the torque transmitted from the tandem wing vortex sensor to the diaphragmatic flange under pressurized contact with the two piezoelectric crystals. The noises in the axial direction load the two piezoelectric elements in the same directions and, consequently, produces no signal. The noises in all lateral directions do not load any piezoelectric element and, consequently, produce no signal. The piezoelectric transducer is designed to produce signals only when the tandem wing vortex sensor experiences torque. The two wings in the tandem wing vortex sensor are balanced in mass and, consequently, the inertia forces on the wings do not produce any signal. Therefore, the tandem wing vortex shedding flowmeter of the present invention puts out signals related to the vortex shedding only. The signal amplitude is very high even when the vortices are weak at low fluid velocities because of the mechanical preamplification provided by the large wing surface area and long torque arm and because the mechanically preamplified torque is transmitted to the piezoelectric transducer in full strength without being partially cancelled by the mechanical rigidity of the sensor assembly. The signal is not mixed with noises because the combination of the piezoelectric transducer and the tandem wing vortex sensor picks up virtually no noise. Therefore, the tandem wing vortex shedding flowmeter of the present invention has a signal to noise ratio easily 20 times greater than that of any existing vortex shedding flowmeters. The amplitude of the signal is proportional to the square of the fluid velocity. The tandem wing vortex shedding flowmeter of the present invention is capable of measuring fluid velocities 4.5 times smaller than the minimum flow velocities measurable by the existing vortex shedding flowmeters.

It should be understand that, at high fluid velocities, the pressure of momentum fluctuations associated with the vortex shedding phenomena have more than enough strength to be detected by almost any form of the vortex sensing devices. As a consequence, all of the aforementioned finesse of design in the construction of the tandem wing vortex shedding flowmeter of the present inventory should be focused on the measurement of the fluid velocity at the lower end of the operating range.

Even if all the aforementioned finesse of the design in the construction of the vortex shedding flowmeter is ignored, the tandem wing vortex shedding flowmeter will still measure the fluid velocity in the middle and upper end of the operating range as long as the two wings in the tandem wing vortex sensor are balanced in mass.

It should be mentioned that the tandem wing vortex shedding flowmeter of the present invention can be converted to a three-in-one meter that measures the fluid velocity, fluid density and the mass flow rate. The amplitude of the alternating torque on the tandem wing vortex sensor is proportional to the dynamic pressure of the moving fluid that is equal to the fluid density times one half of the square of the fluid velocity, while the frequency of the alternating torque is proportional to the fluid velocity. By combining the information on the frequency and the amplitude of the alteranting torque detected by the tandem wing vortex sensor, one can determine the fluid density, fluid velocity and the product of the density and velocity. By incorporating an analyzer that detects the frequency as well as the amplitude of the torque on the tandem wing vortex sensor and a process that computes the fluid velocity and fluid density by using the data on the aforementioned frequency and amplitude to the embodiment shown in FIGS. 1, 2, 3 and 4, the tandem wing vortex shedding flowmeter of the present invention can be converted to a three-in-one meter.

Figure 5:
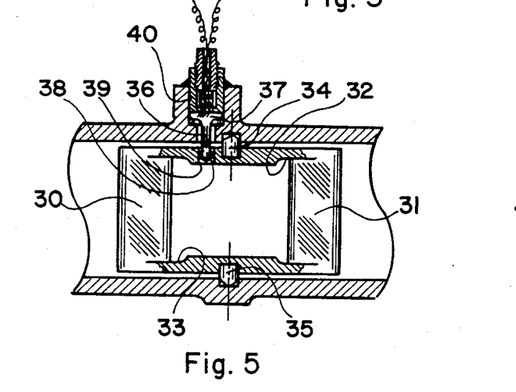
FIG. 5 illustrates a cross section of another embodiment of the transducer installed in conjunction with the tandem wings such as that included in the vortex shedding flowmeter shown in FIGS. 1 and 2.

In FIG. 5 there is illustrated a cross section of another embodiment of the tandem wing vortex sensor usable in conjunction with a tandem wing vortex shedding flowmeter such as that shown in FIGS. 1 and 2. The tandem wing vortex sensor comprising the two wings 30 and 31 connected to one another by a pair of connecting members 32 and 33 are pivotably secured to the wall of the flow passage by means of a pair of journals 34 and 35 disposed in line. The torque transmitter 36 extending from the web 37 affixed to the diaphragmatic flange of the piezoelectric transducer assembly, is kinematically coupled to the connecting member 32 by the ball end 38 of the torque transmitter 36 engaging a hole 39 included in the connecting member 32 in a close tolerance, wherein the hole 39 is disposed eccentric from and parallel to the pivoting axis of the tandem wing vortex sensor. The piezoelectric transducer assembly 40 having essentially the same elements and construction as that described in conjunction with FIGS. 3 and 4 includes a pair of piezoelectric elements now disposed on a plane parallel to the central axis of the flow passage and perpendicular to the pivoting axis of the tandem wing vortex sensor, which are disposed in mirror image to one another about a plane simultaneously including the central axis of the flow passage and the pivoting axis of the tandem wing vortex sensor. This embodiment of the tandem wing vortex sensor operates on the same principles and provides all of the advantages described in conjunction with FIGS. 1, 2, 3 and 4.

Figure 6:
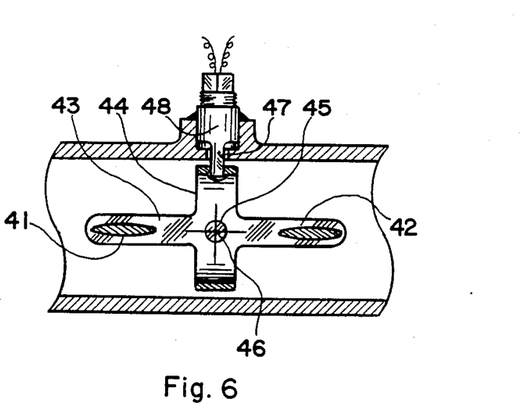
FIG. 6 illustrates a cross section of a further embodiment of the transducer installed in conjunction with the tandem wings such as that included in the vortex shedding flowmeter shown in FIGS. 1 and 2.

In FIG. 6 there is illustrated a cross section of a further embodiment of the tandem wing vortex sensor, which cross section is taken along a plane including the central axis of the flow passage. The tandem wing vortex sensor including the two wings 41 and 42 connected to one another by at least one connecting member 43 includes a tubular mid-section 44 that is pivotably secured to the wall of the flow passage by means of at least one journal 45, of which center line defines the pivoting axis. A torque transmitter 47 extending from the web secured to the diaphragmatic flange of the piezoelectric transducer assembly 48 is disposed in a perpendicular relationship to the pivoting axis 46 and kinematically linked to the wall of the tubular mid-section 44. In this particular arrangement, the torque transmitter 47 is made of a flexible flat bar that is affixed to the wall of the tubular mid-section 44 of the tandem wing vortex sensor. Of course, the torque transmitter with a swivel ball joint as shown in FIG. 5 may be employed in place of the flexible torque transmitter employed in FIG. 6. It should be also mentioned that the torque transmitter with the swivel ball joint employed in FIG. 5 may be replaced with the flexible torque transmitter shown in FIG. 6. The piezoelectric transducer assembly 48 having the same elements and construction as that described in conjunction with FIGS. 3 and 4 includes a pair of the piezoelectric elements disposed on a plane parallel to the central axis of the flow passage and the pivoting axis 46, which are disposed in mirror image to one another about a plane including the pivoting axis 46 and perpendicular to the central axis of the flow passage. The tandem wing vortex sensor shown in FIG. 6 operates on the same principles and provides all of the advantages described in conjunction with FIGS. 1, 2, 3 and 4.

Figure 7:
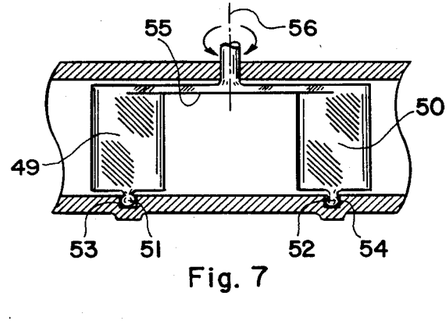
FIG. 7 illustrates another embodiment of the tandem wings usable in conjunction with the vortex shedding flowmeter of the present invention.

In FIG. 7 there is illustrated another embodiment of the tandem wing vortex sensor that is usable in conjunction with the tandem wing vortex shedding flowmeter of the present invention. In this particular embodiment, the first extremities of the two wings 49 and 50 are secured to the wall of the flow passage in a swiveling relationship as the ball swivel ends 51 and 52 respectively included in the first extremities of the two wings engage the blind holes 53 and 54 included in the wall of the flow passage, respectively. The second extremities of the two wings 49 and 50 are secured to a connecting member 55 connecting the two wings to one another, which are journaled to the wall of the flow passage at the mid-section thereof. As a consequence, the combination including the connecting member 55 and the second halves of the wings 49 and 50 are pivotable about a pivoting axis 56. Although the particular embodiment shown in FIG. 7 is assigned to be connected to a piezoelectric transducer of type shown in FIG. 3 and 4, it may be combined with the piezoelectric transducer of type shown in FIGS. 5 or 6.

Figure 8:
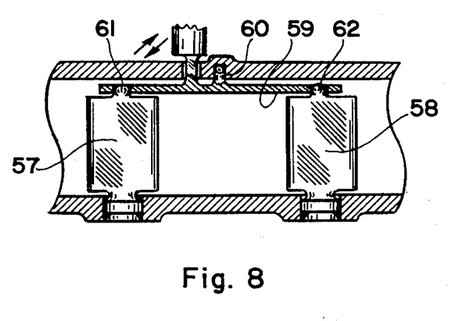
FIG. 8 illustrates a further embodiment of the tandem wings usable in conjunction with the vortex shedding flowmeter of the present invention.

In FIG. 8 there is illustrated a further embodiment of the tandem wing vortex sensor usable in conjunction with the tandem wing vortex shedding flowmeter of the present invention. In this particular embodiment, the first extremities of the two wings 57 and 58 are secured to the wall of the flow passage in a fixed or semi-fixed relationship, while the second extremities of the two wings are secured to the connecting member pivotably secured to the wall of the flow passage by a journal 60. The connections 61 and 62 between the second extremities of the two wings and the connecting member 59 may be of a simple rotatable joint or swivel joint or flexible semi-fixed joints. Although the particular embodiment shown in FIG. 8 is for the piezoelectric transducer of type shown in FIG. 5, it may be combined with the poezoelectirc transducer of type shown in FIGS. 4 or 6.

Figure 9:
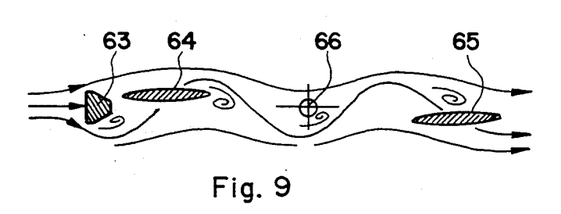
FIG. 9 illustrates an embodiment of the tandem wing vortex sensor installed in conjunction with a vortex generator.

In FIG. 9 there is illustrated another arrangement including the vortex generator comprising a bluff body 63 and a tandem wing vortex sensor including the two wings 64 and 65 pivotably secured about a pivoting axis 66. In the arrangement shown in FIG. 1, there is a sizable distance between the bluff body 5 and the first wing 7 of the tandem wing vortex sensor and, consequently, the lift forces on the two wings are mostly generated by the sinuous streamlines in the form of momentum transfer. It is also noticed in FIG. 1 that the bluff body 5 and the two wings 7 and 8 are disposed substantially in line on a plane including the central axis of the flow passage. In the embodiment shown in FIG. 9, the first wing 64 is disposed immediately down stream of the bluff body 63 in an off-centered relationship, while the second wing 65 is disposed in another off-centered relationship opposite to that of the first wing 64. In this embodiment, the lift on the first wing 64 is mostly generated by the pressure fluctuations associated with the vortices shed from the bluff body, while the lift force on the second wing 65 is generated by the sinuous streamlines. In this particular embodiment, the torque on the tandem wing vortex sensor is generated by the collaboration of the two wings 64 and 65 in the lower end of the range of operation, while it is generated more or less exclusively by the second wing 65 in the middle and upper end of the range of operation. The distance between the two wings 64 and 65 should be determined experimentally so that the lift force on the first wing 64 created by the pressure fluctuation and the lift force on the second wing 65 created by the fluctuation in the sinuous streamlines collaborate to produce maximum torques on the tandem wing vortex sensor in the lower end of the range of operation.

Figure 10:
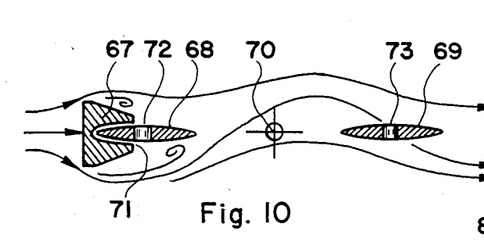
FIG. 10 illustrates another embodiment of the tandem wing vortex sensor installed in conjunction with a vortex generator.

In FIG. 10 there is illustrated a further arrangement for the combination of the bluff body 67 and the two wings 68 and 69 included in the tandem wing vortex sensor pivoting about the pivoting axis 70. The trailing edge of the bluff body 67 has a deep axial crevice 71 that receives the leading edge-side half of the first wing 68. A plurality of round or slotted holes 72 disposed following the center line of and through the first wing 68 promotes the interaction in the pressure between the two sides of the bluff body and, consequently, enhances the vortex shedding in more regular patterns. The plurality of round or slotted holes 73 disposed through the second wing 69 is to satisfy the condition of the symmetry about the pivoting axis 70 that is required to balance the mass distribution in the tandem wing vortex sensor. The lift force on the first wing 68 is mostly generated by the fluctuating pressure while the lift force on the second wing 69 is generated by the fluctuations in the sinuous streamlines and, consequently, the distance between the two wings 68 and 69 must be optimized to produce a maximum torque that is created by the two wings 68 and 69 in collaboration in the lower end of the range of operation. When the fluid velocity is above the lower end of the range of operation, the strength of the vortices is high enough to generate high amplitude torques produced mostly by the second wing 69.

Figure 11:
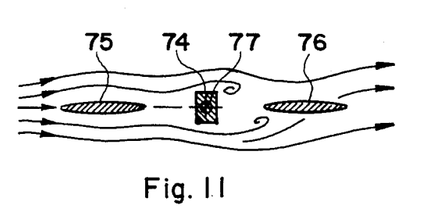
FIG. 11 illustrates a further embodiment of the tandem wing vortex sensor installed in conjunction with a vortex generator.

In FIG. 11 there is illustrated a combination of the bluff body 74 and the tandem wing vortex sensor including the two wings 75 and 76. The bluff body 74 is disposed intermediate the two wings 75 and 76 wherein the center line of the bluff body coincides with the pivoting axis 77 of the tandem wing vortex sensor. In this arrangement, the torque on the tandem wing vortex sensor is generated by only one of the two wings 75 and 76 that is in the downstream side of the bluff body 74. The other wing in the upstream side of the bluff body 74 provides the role of balancing the mass distribution in the tandem wing vortex sensor, which mass balancing is required to make the vortex sensor immune to the noises. When the cross section of the bluff body 74 is symmetric about the plane including the pivoting axis 77 and perpendicular to the central axis of the flow passage, the vortex shedding flowmeter employing the combination shown in FIG. 11 measures fluid flows in both directions.

Figure 12:
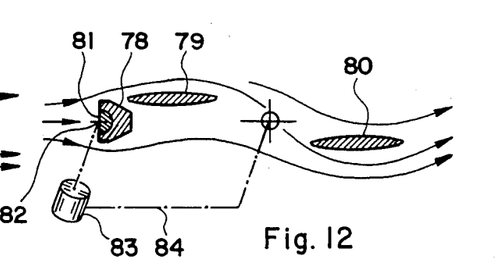
FIG. 12 illustrates a combination of a tandem wing vortex sensor and a vortex generator with means for generating artificial vortices.

In FIG. 12 there is illustrated a combination including the bluff body 78 and the tandem wing vortex sensor including the two wings 79 and 80, which elements are disposed in essentially the same pattern as that illustrated in FIG. 9. The bluff body 78 includes a rotatable insert member 81 of semi-circular cross section that is rotatable about an axis 82. The insert member 81 is an artificial vortex generator that is driven by a pulsed driver motor 83 controlled by the output 84 from the piezoelectric transducer 85 sensing the torque on the tandem wing vortex sensor. When the fluid velocity is high enough to shed the vortices intense enough to be detected by the tandem wing vortex sensor, the vortex shedding flowmeter employing the embodiment shown in FIG. 12 operates on the same principles as those described in conjunction with FIGS. 1, 2, 3 and 4 wherein the artificial vortex generator 82 is tucked in the neutral position as shown in FIG. 12 and the shedding frequency of the natural vortices is detected by the tandem wing vortex sensor.

Figures 13, 14, 15:
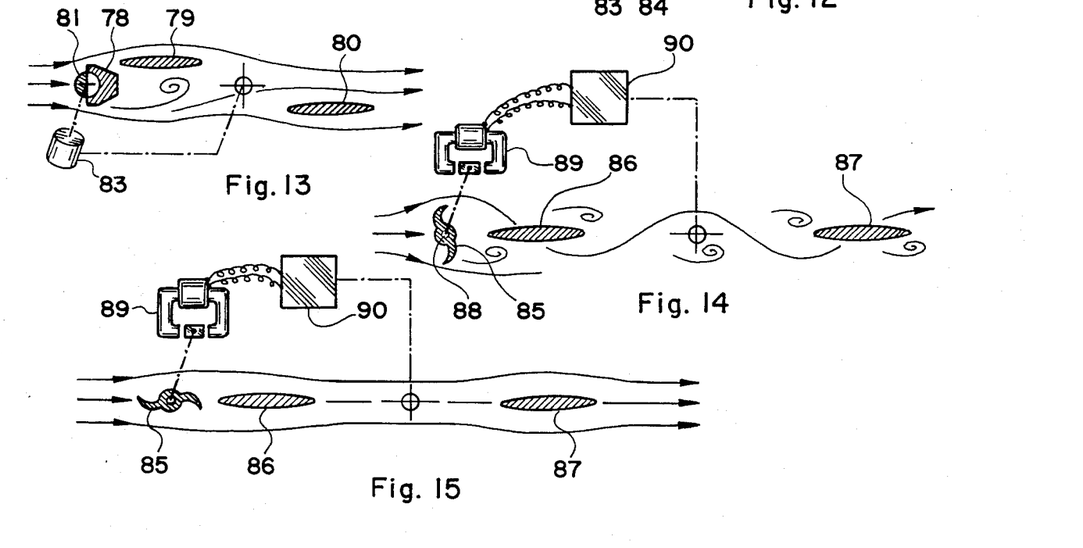
FIG. 13 illustrates the combination shown in FIG. 12 wherein the means for generating artificial vortices are in action.
FIG. 14 illustrates another combination of a tandem wing vortex sensor and a vortex generator with means for generating artificial vortices.
FIG. 15 illustrates the combination shown in FIG. 14 wherein the means for generating artificial vortices are in action.

In FIG. 13 there is illustrated the mode of operation of the vortex shedding flowmeter employing the embodiment shown in FIG. 12. When the fluid velocity is too low to generate natural vortices of sufficient strength for the detection by the tandem wing vortex sensor, the driver motor rotates the artificial vortex generator 81 over 180 degrees from the tucked-in position shown in FIG. 12 to the protruding position shown in FIG. 13. As the cross section of the combination of the bluff body 78 and the artificial vortex generator 81 changes from the blunt cross section shown in FIG. 12 to a streamlined cross section shown in FIG. 13, the streamlines undergo a drastic change. Such a change of the streamlines is sensed by the first wing 79 first and then by the second wing 80 later, which are registered by the transducer detecting the torque on the tandem wing vortex sensor as two consecutive peaks in the signals. The time interval between the two consecutive peaks in the signal is the time required for the fluid to flow from the first wing 79 to the second wing 80 and, consequently, the fluid velocity averaged over the cross section area of the flow passage can be determined from the aforementioned time of fluid flow from the first wing 79 to the second wing 80. Another 180 degree rotation of the artificial vortex generator 81 from the protruding position to the tucked-in position produces another time of travel. It is clear that every 180 degree or 360 degree rotation of the artificial vortex generator 81 produces one value of the time of travel, which is converted to information on the flow rate by a processor using the signals from the piezoelectric transducer as input data. In actual operation of measuring the fluid velocity by the method of artificial vortex shedding, the artificial vortex generator 81 is rotated over 180 or 360 degrees in a pulse by the driver motor, which rotation is triggered by the second pulse of every two consecutive pulses detected by the piezoelectric transducer. Naturally, the fluid velocity is proportional to the frequency of the peaks detected by the piezoelectric transducer.

It is clear that the method of artificial vortex generation described in conjunction with FIGS. 12 and 13 can be incorporated into the embodiment shown in FIG. 11, wherein the artificial vortex generator should be rotated over 180 or 360 degrees in pulse triggered by every peak in the torque signal detected by the tandem wing vortex sensor.

In FIG. 14 there is illustrated another embodiment of the combination including the bluff body 85 and the tandem wing vortex sensor including the two wings 86 and 87. The bluff body rotatably about its own central axis 88 has a cross section that generates torque about its central axis 88 from the moving fluid. The self-rotating bluff body 85 includes a magnetic braking means 89 that is controlled by a controller receiving input signal from the piezoelectric transducer detecting torque on the tandem wing vortex sensor. In the normal operation wherein the natural vortices have sufficient intensity for detection by the tandem wing vortex sensor, the bluff body 85 is kept at a stationary position by the magnetic braking means 89 wherein the bluff body 85 provides the maximum blocking against the moving fluid and, consequently, sheds natural vortices at frequencies directly proportional to the fluid velocity. In the normal operation, the fluid velocity is determined from the frequency of the natural vortex shedding on principles as described in conjunction with FIGS. 1, 2, 3 and 4.

In FIG. 15 there is illustrated the combination shown in FIG. 14 that is now operating in the mode of the artificial vortex shedding. When the piezoelectric transducer detecting the torque on the tandem wing vortex sensor fails to detect the natural vortices, the controller 90 releases the magnetic braking in a pulse allowing the bluff body 85 to rotate over 180 or 360 degrees. The sudden change of the streamlines caused by the aforementioned pulsed rotation of the bluff body 85 produces lift force on the first wing 86 first and on the second wing 87 later. Every time the controller 90 receives the second peak of every two consecutive peaks of the signal from the piezoelectric transducer detecting the torque on the tandem wing vortex sensor, the controller 90 releases the magnetic braking in a pulse and allows the bluff body 85 to rotate over 180 or 360 degrees. The fluid velocity is determined from the frequency of the braking release as the latter is directly proportional to the former.

It should be mentioned that the embodiment shown in FIGS. 14 and 15 can be incorporated into the arrangement shown in FIG. 11 wherein the bluff body is disposed intermediate the two wings included in the tandem wing vortex sensor. In such an embodiment, the magnetic braking has to be released in pulse allowing the bluff body to rotate over 180 or 360 degrees triggered by every pulse detected by the piezoelectric transducer detecting the torque on the tandem wing vortex sensor.

It should be understood that the use of the piezoelectric transducers such as those shown in FIGS. 3, 5 and 6 in detecting the torque experienced by the tandem wing vortex sensor is only one of many preferred means usable in the construction of the tandem wing vortex shedding flowmeter of the present invention. In place of the piezoelectric transducer, other transducer means such as the strain gauge transducer or magnetic proximity transducer or various accelerometer transducers may be employed. Therefore, the present invention employing the combination of the bluff body and the tandem wing vortex sensor in the construction of the tandem wing vortex shedding flowmeter is not limited to the illustrated embodiments using the piezoelectric transducer means and, accordingly, all suitable modifications using different transducer means may be resorted to falling within the scope of the present invention.

While the principles of the present invention have now been made clear by the illustrative embodiments, it will be immediately obvious to those skilled in the art many modifications of the structures, elements, arrangements, proportions and materials which are particularly adapted to the specific working environments and operating conditions in the practice of the invention without departing from those principles.

The embodiments of the invention in which an exclusive property or privilege is claimed are difined as follows:

1. A device for measuring flow comprising in combination:
   (a) a flowmeter body including a flow passage extending from one extremity to the other extremity of said flowmeter body;
   (b) a vortex generator of an elongated cylindrical shape having a blunt cylindrical side surface facing upstream partially obstructing fluid flow through said flow passage, said vortex generator disposed across a first cross section of the flow passage;
   (c) a vortex sensor comprising a first wing disposed across a second cross section of the flow passage in a generally parallel arrangement with respect to said vortex generator and a second wing disposed across a third cross section of the flow passage intermediate said first and second cross sections in a generally parallel arrangement with respect to said vortex generator; wherein said first and second wings with chord lines generally parallel to the central axis of the flow passage are connected to one another by at least one connecting member disposed generally parallel to the central axis of the flow passage, and the combination of said first and second wings is secured to the wall of the flow passage in an arrangement wherein at least one extremity of said combination of the first and second wings adjacent to the wall of the flow passage is pivotable over a small angle about an axis of pivot generally parallel to and located intermediate the first and second wings, and the extremities of the first and second wings opposite to said at least one extremity of said combination of the first and second wings are secured to the wall of the flow passage; and
   (d) a transducer means under a pressurized contact with a thin flange including an elongated extension, wherein an extremity of said elongated extension is connected to said connecting member, said transducer means for detecting torque imposed on said vortex sensor by vortices generated by said vortex generator;

wherein said device determines rate of fluid flow through the flow passage by measuring the frequency of vortex shedding from said vortex generator.

2. The combination as set forth in claim 1 wherein extremities of the first and second wings opposite to said at least one extremity of the combination of the first and second wings are respectively secured to the wall of the flow passage in a pivoting relationship about an axis generally parallel to the central axis of the flow passage.

3. The combination as set forth in claim 1 wherein extremities of the first and second wings opposite to said at least one extremity of the combination of the first and second wings are respectively secured to the wall of the flow passage in a fixed relationship.

4. The combination as set forth in claim 1 wherein said transducer means comprises a pair of Piezo electric elements disposed on a first plane generally parallel to said axis of pivot in a mirror image to one another about a second plane perpendicular to said first plane and including said axis of pivot, wherein said elongated extension extending from said flange is angled and connected to said connecting member.

5. The combination as set forth in claim 1 wherein said transducer means comprises a pair of Piezo electric elements disposed on a first plane generally perpendicular to said axis of pivot in a mirror image to one another about a second plane perpendicular to said first plane and including said axis of pivot, wherein said elongated extension extending from said flange is connected to said connecting member at a section offset from said axis of pivot.

6. A device for measuring flow comprising in combination:
   (a) a flowmeter body including a flow passage extending from one extremity to the other extremity of said flowmeter body;
   (b) a vortex generator of an elongated cylindrical shape having a blunt cylindrical side surface facing upstream partially obstructing fluid flow through said flow passage, said vortex generator disposed across a first cross section of the flow passage;
   (c) a vortex sensor comprising a first wing disposed across a second cross section of the flow passage in a generally parallel arrangement with respect to said vortex generator and a second wing disposed across a third cross section of the flow passage intermediate said first and second cross sections in a generally parallel arrangement with respect to said vortex generator; wherein said first and second wings with chord lines generally parallel to the central axis of the flow passage are separated from one another by a distance approximately equal to the distance between two consecutive vortices shed from said vortex generator times an odd integer number, and the first and second wings are connected to one another by at least one connecting member disposed generally parallel to the central axis of the flow passage, and the combination of the first and second wings is secured to the wall of the flow passage in an arrangement wherein at least one extremity of said combination of the first and second wings adjacent to the wall of the flow passage is pivotable over a small angle about an axis of pivot generally parallel to and located intermediate the first and second wings; and
   (d) a transducer means for detecting torque imposed on said vortex sensor by vortices generated by said vortex generator;

wherein said device determines rate of fluid flow through said flow passage by measuring the frequency of vortex shedding from said vortex generator.

7. The combination as set forth in claim 6 wherein said transducer means comprises a pair of Piezo electric elements disposed on a first plane generally parallel to said axis of pivot in a mirror image to one another about a second plane perpendicular to said first plane and including said axis of pivot, wherein said pair of Piezo electric elements are under a pressurized contact with a flange including an elongated extension which is angled and connected to said connecting member.

8. The combination as set forth in claim 6 wherein said transducer means comprises a pair of Piezo electric elements disposed on a first plane generally perpendicular to said axis of pivot in a mirror image to one another about a second plane perpendicular to said first plane and including said axis of pivot, wherein said pair of Piezo electric elements are under a pressurized contact with a flange including an elongated extension which is connected to said-connecting member at a section offset from said axis of pivot.

9. The combination as set forth in claim 6 wherein extremities of the first and second wings opposite to said at least one extremity of the combination of the first and second wings are respectively secured to the wall of the flow passage in a pivoting relationship about an axis generally parallel to the central axis of the flow passage.

10. The combination as set forth in claim 6 wherein extremities of the first and second wings opposite to said at least one extremity of the combination of the first and second wings are respectively secured to the wall of the flow passage in a fixed relationship.

11. A device for measuring flow comprising in combination:
(a) a flowmeter body including a flow passage extending from one extremity to the other extremity of said flowmeter body;
(b) a vortex generator of an elongated cylindrical shape having at least one blunt cylindrical side surface generally perpendicular to the central axis of the flow passage partially obstructing fluid flow through said flow passage, said vortex generator disposed across a first cross section of the flow passage;
(c) a vortex sensor comprising a first and second wings respectively disposed across a second cross section of the flow passage upstream to said first cross section and a third cross section of the flow passage downstream to said first cross section in a parallel arrangement with respect to said vortex generator on a plane generally parallel to the central axis of the flow passage; wherein said first and second wings are connected to one another by at least one connecting member disposed generally parallel to the central axis of the flow passage, and the combination of the first and second wings is secured to the wall of the flow passage in an arrangement wherein at least one extremity of said combination of the first and second wings adjacent to the wall of the flow passage is pivotable over a small angle about an axis of pivot generally parallel to and located intermediate the first and second wings; and
(d) a transducer means for detecting torque imposed on said vortex sensor by vortices generated by said vortex generator;
wherein said device determines rate of fluid flow through said flow passage by measuring the frequency of vortex shedding from said vortex generator.

12. The combination as set forth in claim 11 wherein said transducer means comprises a pair of Piezo electric elements disposed on a first plane generally parallel to said axis of pivot in a mirror image to one another about a second plane perpendicular to said first plane and including said axis of pivot, wherein said pair of Piezo electric elements are under a pressurized contact with a flange including an elongated extension which is angled and connected to said connecting member.

13. The combination as set forth in claim 11 wherein said transducer means comprises a pair of Piezo electric elements disposed on a first plane generally perpendicular to said axis of pivot in a mirror image to one another about a second plane perpendicular to said first plane and including said axis of pivot, wherein said pair of Piezo electric elements are under a pressurized contact with a flange including an elongated extension which is connected to said connecting member at a section offset from said axis of pivot.

14. The combination as set forth in claim 11 wherein extremities of the first and second wings opposite to said at least one extremity of the combination of said first and second wings are connected to one another by another connecting member, wherein said another connecting member is secured to the wall of the flow passage in a pivoting relationship about said axis of pivot.

15. The combination as set forth in claim 11 wherein extremities of the first and second wings opposite to said at least one extremity of the combination of the first and second wings are respectively secured to the wall of the flow passage in a pivoting relationship about an axis generally parallel to the central axis of the flow passage.

16. The combination as set forth in claim 11 wherein extremities of the first and second wings opposite to said at least one extremity of the combination of the first and second wings are respectively secured to the wall of the flow passage in a fixed relationship.

17. A device for measuring flow comprising in combination:
(a) a flowmeter body including a flow passage extending from one extremity to the other extremity of said flowmeter body;
(b) a natural vortex generator of an elongated cylindrical shape having a blunt cylindrical side surface facing upstream partially obstructing the fluid flow through said flow passage, said blunt cylindrical side surface including a longitudinal groove receiving an artificial vortex generator of an elongated cylindrical shape having a generally semicircular cross section; wherein the combination of said natural and artificial vortex generators is disposed across a first cross section of the flow passage;
(c) a vortex sensor comprising a first wing disposed across a second cross section of the flow passage in a generally parallel arrangement with respect to said vortex generators and a second wing disposed across a third cross section of the flow passage intermediate said first and second cross sections in a generally parallel arrangement with respect to said vortex generators; wherein said first and second wings with chord lines generally parallel to the central axis of the flow passage are connected to one another by at least one connecting member disposed generally parallel to the central axis of the flow passage, and the combination of said first and second wings is secured to the wall of the flow passage in an arrangement wherein at least one extremity of said combination of the first and second wings adjacent to the wall of the flow passage is pivotable over a small angle about an axis of pivot generally parallel to and located intermediate the first and second wings;
(d) a transducer means for detecting torque imposed on said vortex sensor by vortices generated by said vortex generator; and
(e) means for generating a rotation of said artificial vortex generator, wherein the rotation of said artificial vortex generator generates a series of vortices at a frequency proportional to the frequency of the rotation of said artificial vortex generator; said means for generating angular motion including means for activating and deactivating said means for generating rotation;
wherein said device determines rate of fluid flow from the frequency of natural vortex shedding from said natural vortex generator with a stationary artificial vortex generator when the fluid flow produces natural vortices of detectable strength, and said device determines rate of fluid flow from the time of travel of artificial vortices generated by said artificial vortex generator under rotation when the fluid flow does not produce natural vortices of detectable strength.

18. The combination as set forth in claim 17 wherein said transducer means comprises a pair of Piezo electric elements disposed on a first plane generally parallel to said axis of pivot in a mirror image to one another about a second plane perpendicular to said first plane and including said axis of pivot, wherein said pair of Piezo electric elements are under a pressurized contact with a flange including an elongated extension which is angled and connected to said connecting member.

19. The combination as set forth in claim 17 wherein said transducer means comprises a pair of Piezo electric elements disposed on a first plane generally perpendicular to said axis of pivot in a mirror image to one another about a second plane perpendicular to said first plane and including said axis of pivot, wherein said pair of Piezo electric elements are under a pressurized contact with a flange including an elongated extension which is connected to said connecting member at a section offset from said axis of pivot.

20. The combination as set forth in claim 17 wherein extremities of the first and second wings opposite to said at least one extremity of the combination of the first and second wings are respectively secured to the wall of the flow passage in a fixed relationship.

* * * * *